(12) United States Patent
Maruyama

(10) Patent No.: US 6,396,884 B1
(45) Date of Patent: May 28, 2002

(54) AUTOMATIC FREQUENCY CONTROL CIRCUIT

(75) Inventor: Hidenori Maruyama, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/375,218

(22) Filed: Aug. 16, 1999

(30) Foreign Application Priority Data

Aug. 18, 1998 (JP) ............................................ 10-231552

(51) Int. Cl.[7] .............................. H04L 27/06; H04B 1/18
(52) U.S. Cl. ...................... 375/344; 455/192.2; 348/735
(58) Field of Search ................................. 375/344, 336, 375/316; 455/192.2, 182.2; 348/735; 329/306, 307

(56) References Cited

U.S. PATENT DOCUMENTS

| | | | | |
|---|---|---|---|---|
| 5,579,346 A | * | 11/1996 | Kanzaki | ........................ 329/307 |
| 5,920,599 A | * | 7/1999 | Igarashi | ........................ 375/316 |
| 6,151,371 A | * | 11/2000 | Maruyama | ................... 375/344 |

FOREIGN PATENT DOCUMENTS

| | | |
|---|---|---|
| JP | 7-95253 | 4/1995 |
| JP | 7-123125 | 5/1995 |
| JP | 8-56244 | 2/1996 |
| JP | 10-84396 | 3/1998 |
| JP | 10-163816 | 6/1998 |

* cited by examiner

*Primary Examiner*—Chi Pham
*Assistant Examiner*—Khai Tran
(74) *Attorney, Agent, or Firm*—Dickstein Shapiro Morin & Oshinsky LLP

(57) ABSTRACT

An automatic frequency control circuit includes a phase difference detection circuit, average value calculation circuit, weighting circuit, and phase correction circuit. The phase difference detection circuit obtains the phase difference between pattern signals per period on the basis of a quadrature-demodulated pattern signal component and a pattern signal component one period before the quadrature-demodulated pattern signal component. The average value calculation circuit calculates the average value of first phase differences between the pattern signals repetitively output from the phase difference detection circuit, thereby obtaining a second phase difference in units of symbols in the current burst. The weighting circuit weights the second phase difference from the average value detection circuit and a third phase difference up to the previous burst, thereby obtaining a fourth phase difference up to the current burst. The phase correction circuit corrects a demodulated received signal on the basis of the fourth phase difference from the weighting circuit.

9 Claims, 3 Drawing Sheets

AUTOMATIC FREQUENCY CONTROL CIRCUIT

BACKGROUND OF THE INVENTION

The present invention relates to an automatic frequency control circuit for correcting the influence of a frequency offset at a radio data communication terminal in a system of equalizing received signals by obtaining transmission path characteristics during a preamble period by a narrow-band modulation method such as a GMSK (Gaussian-filtered Minimum Shift Keying) modulation method.

In many cases, a synthesizer and crystal oscillator with high oscillation precision cannot be used to generate radio frequency signals under limitations on cost, size, and the like. The radio section generally performs automatic frequency control to allow communication while controlling the frequency offset between the transmitting and receiving sides.

FIG. 4 shows the arrangement of a receiver side in a conventional automatic frequency control circuit disclosed in Japanese Patent Laid-Open No. 10-163816.

In FIG. 4, the receiver comprises an antenna 41 for receiving radio waves from a transmitter, a bandpass filter 42 for extracting a signal of a necessary band from the received signal, an amplifier 43 for amplifying the signal output from the bandpass filter 42, a mixer 44 for mixing the output signal from the amplifier 43 and a local frequency signal into a predetermined frequency signal, an oscillator 45 for oscillating the local frequency signal and outputting it to the mixer 44, an amplifier 46 for amplifying the output signal from the mixer 44, a quadrature demodulation circuit made up of mixers 47 and 48 for quadrature-demodulating the received signal output from the amplifier 46 and outputting I and Q signals (baseband signals) having a phase difference of 90°, a 0°/90° phase generator 49, and an oscillator 50, and A/D converters 51 and 52 for A/D-converting the I and Q signals made of real and imaginary part amplitude values that are output from the quadrature detection circuit.

The receiver further comprises, as an automatic frequency control circuit, a phase rotating unit 53 for rotating the phases of the demodulated outputs from the A/D converters 51 and 52 by a necessary amount, a phase difference detection circuit 54 for obtaining the phase difference between a current signal component and a signal component one period before the current signal component, an average value detection circuit 55 for integrating the phase difference output from the phase difference detection circuit 54 a predetermined number of times to obtain the average value, an integrating circuit 56 for integrating the average value output from the average value detection circuit 55 in units of symbols, and a vector transformation circuit 57 for transforming a signal output from the integrating circuit 56 into real and imaginary part amplitude values.

Phase control operation of the automatic frequency control circuit having this arrangement will be explained.

When pseudo noise (PN) signals of a predetermined pattern repetitively transmitted from the transmitter during the preamble period before the burst period are received by the antenna 41, they are quadrature-demodulated to output I and Q signals having a phase difference of 90° from the A/D converters 51 and 52. The phase difference detection circuit 54 obtains, using a table, the phases of the I and Q signals made of real and imaginary part amplitude values from the A/D converters 51 and 52, and obtains the phase differences between the obtained phases and a phase obtained from a PN signal before one period. The phase difference detection circuit 54 repeats this phase difference detection operation a predetermined number of times.

The average value detection circuit 55 repetitively receives the phase differences of PN signals from the phase difference detection circuit 54 to calculate an average value $\Delta\theta$. The calculated average value $\Delta\theta$ is fixed during the burst period subsequent to the preamble period. The integrating circuit 56 integrates the average value $\Delta\theta$ in units of symbols, and outputs the integrated value to the vector transformation circuit 57. The vector transformation circuit 57 transforms the output from the integrating circuit 56 into real and imaginary part amplitude values, and outputs them to the phase rotating unit 53. The phase rotating unit 53 synthesizes the outputs from the vector transformation circuit 57 with a received signal, thereby correcting the phase.

In this prior art, the phase difference of the PN signal is obtained every burst. However, under the frequency selective multipath fading environment, a phase difference for accurately correcting the frequency offset between the transmitter and receiver cannot be obtained every burst owing to distortion, noise, and the like.

SUMMARY OF THE INVENTION

It is an object of the present invention to provide an automatic frequency control circuit capable of calculating a phase difference for accurately correcting the frequency offset between the transmitter and receiver every burst even under the frequency selective multipath fading environment, and improving the error rate of demodulated data arising from the influence of the frequency offset.

To achieve the above object, according to the present invention, there is provided an automatic frequency control circuit in a receiver for receiving and quadrature-demodulating a multilevel quadrature-modulated signal transmitted during a preamble period and a data period subsequent to the preamble period, comprising phase difference detection means for obtaining a phase difference between pattern signals per period on the basis of a quadrature-demodulated pattern signal component and a pattern signal component one period before the quadrature-demodulated pattern signal component, the pattern signals being repetitively transmitted with the same pattern from a transmitter during the preamble period, average value calculation means for calculating an average value of first phase differences between the pattern signals repetitively output from the phase difference detection means, thereby obtaining a second phase difference in units of symbols in a current burst, weighting means for weighting the second phase difference from the average value detection means and a third phase difference up to a previous burst, thereby obtaining a fourth phase difference up to the current burst, and phase correction means for correcting a demodulated received signal on the basis of the fourth phase difference from the weighting means.

DESCRIPTION OF THE PREFERRED EMBODIMENT

The present invention will be described in detail below with reference to the accompanying drawings.

Figure 1:
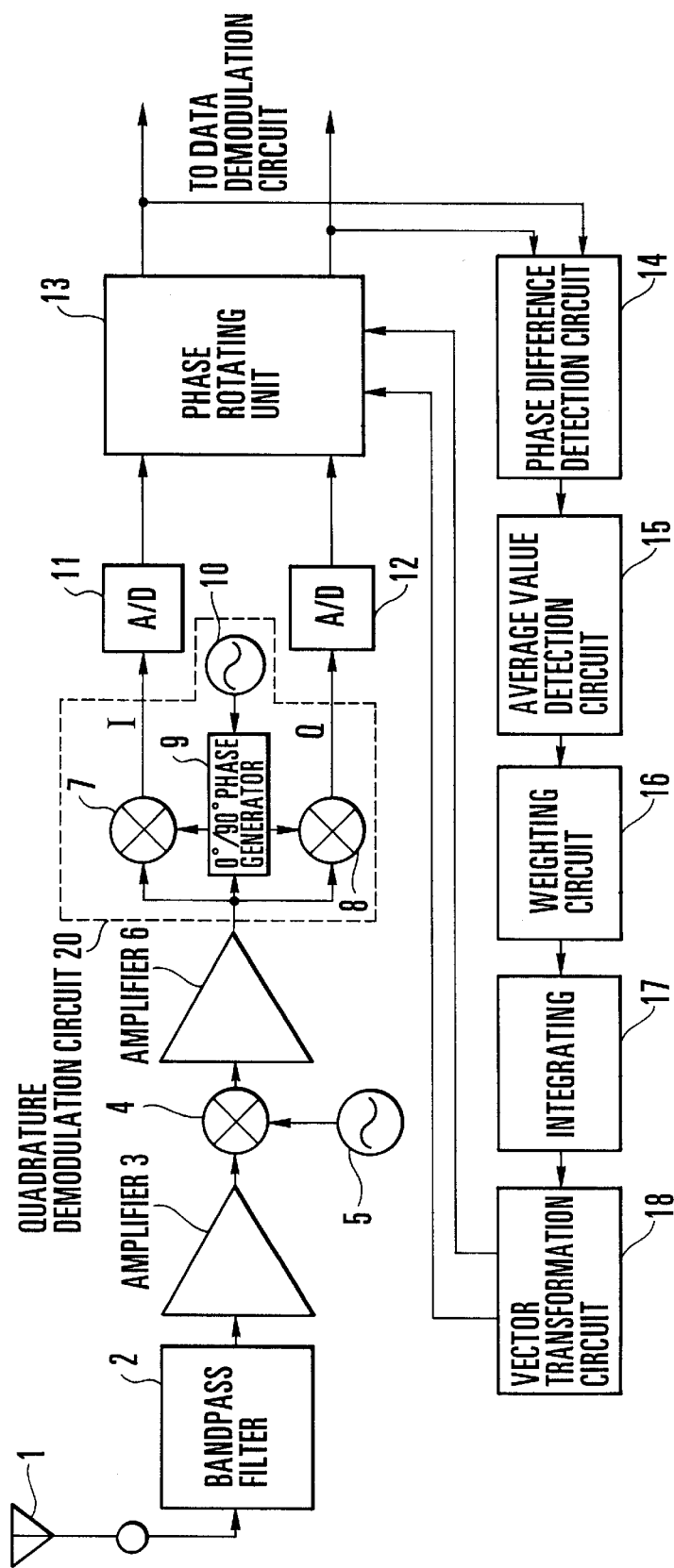
FIG. 1 is a block diagram showing an automatic frequency control circuit on a receiver side according to an embodiment of the present invention.

FIG. 1 shows the arrangement of a receiver side in an automatic frequency control circuit according to an embodiment of the present invention. In FIG. 1, the receiver comprises an antenna 1 for receiving radio waves from a transmitter, a bandpass filter 2 for extracting a signal of a necessary band from the received signal, an amplifier 3 for amplifying the output signal from the bandpass filter 2, a mixer 4 for mixing the output signal from the amplifier 3 and a local frequency signal into a predetermined frequency signal, an oscillator 5 for oscillating the local frequency signal and outputting it to the mixer 4, an amplifier 6 for amplifying the output signal from the mixer 4, a quadrature demodulation circuit 20 for quadrature-demodulating the received signal output from the amplifier 6 and outputting I and Q signals (baseband signals) having a phase difference of 90°, and A/D converters 11 and 12 for A/D-converting the I and Q signals made of real and imaginary part amplitude values that are output from the quadrature detection circuit 20.

The receiver further comprises, as an automatic frequency control circuit, a phase rotating unit 13 for rotating the phases of the demodulated outputs from the A/D converters 11 and 12 by a necessary amount, a phase difference detection circuit 14 for obtaining the phase difference between a current signal component and a signal component one period before the current signal component, an average value detection circuit 15 for integrating the phase differences output from the phase difference detection circuit 14 a predetermined number of times to obtain the average value, a weighting circuit 16 for averaging the average value up to the previous burst and the average value of the current burst that is output from the average value detection circuit 15, an integrating circuit 17 for integrating the average value output from the weighting circuit 16 in units of symbols, and a vector transformation circuit 18 for transforming a signal output from the integrating circuit 17 into real and imaginary part amplitude values.

The quadrature demodulation circuit 20 is made up of mixers 7 and 8 for mixing an output from the amplifier 6 with carrier wave regeneration signals having a phase difference of 90°, and quadrature-demodulating the mixed signals, a 0°/90° phase generator 9 for outputting two carrier wave regeneration signals having a phase difference of 90° to the mixers 7 and 8, and an oscillator 10 for oscillating a reference carrier wave regeneration signal phase-locked with the carrier wave, and outputting it to the 0°/90° phase generator 9.

Figure 2:
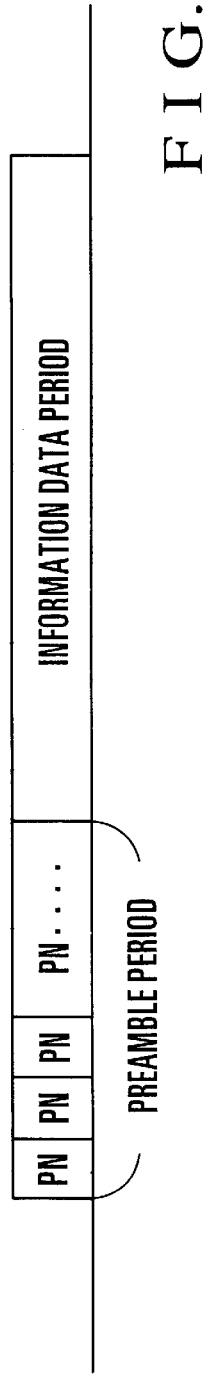
FIG. 2 is a view showing a transmission frame format.

FIG. 2 shows the transmission frame format from the transmitter. In FIG. 2, one burst is made up of a preamble period for detecting frame synchronization and the like, and an information data period subsequent to the preamble period. The burst is transmitted from the transmitter to the receiver at a burst interval. During the preamble period, PN signals of the same pattern are repetitively transmitted from the transmitter.

During a predetermined preamble period, a phase difference $\Delta\theta$ in units of symbols is obtained based on the phase difference between sample PN signals apart by one period. A value $\Delta\theta1$ prepared by multiplying the obtained phase difference $\Delta\theta$ of the current burst by an arbitrary coefficient $\alpha$ is added to a value $\Delta\theta2$ prepared by multiplying a held phase difference $\Delta\theta3'$ up to the previous burst by an arbitrary coefficient $\beta$ to obtain a sum. A phase difference $\Delta\theta3$ as the average value of the sum is held during one burst and integrated in units of symbols, thereby correcting the phase on the receiver side.

This will be described in detail. In the receiver, a PN signal from the transmitter is received by the antenna 1, passes through the bandpass filter, and is amplified by the amplifier 3. The output signal from the amplifier 3 is mixed with a local frequency signal from the oscillator 5 into a predetermined frequency signal by the mixer 4, and amplified by the amplifier 6. The received signal output from the amplifier 6 is quadrature-demodulated by the quadrature demodulation circuit 20 to output I and Q signals having a phase difference of 90°. The I and Q signals output from the quadrature demodulation circuit 20 are converted into digital signals by the A/D converters, and output to the phase rotating unit 13. The phase rotating unit 13 rotates the phase on the basis of correction real and imaginary part amplitude values, thereby correcting the phase of the received signal.

The phase difference detection circuit 14 receives the I and Q signals from the A/D converters 11 and 12 that are quadrature-demodulated via the phase rotating unit 13, and obtains the phase of the current PN signal using the real and imaginary part amplitude values and a table. Then, the phase difference detection circuit 14 obtains the phase difference between the obtained phase of the current PN signal and the phase of a PN signal one period before the current PN signal. The phase difference detection circuit 14 repeats this phase difference detection operation every input PN signal, and outputs the obtained phase differences to the average value detection circuit 15. The average value detection circuit 15 receives the output from the phase difference detection circuit 14 a predetermined number of times, and calculates the average value as the phase difference $\Delta\theta$ in units of symbols.

The weighting circuit 16 averages the sum of the value $\Delta\theta1$ (first weighting phase difference) prepared by multiplying the phase difference $\Delta\theta$ of the current burst output from the average value detection circuit 15 by the arbitrary coefficient $\alpha$, and the value $\Delta\theta2$ (second weighting phase difference) prepared by multiplying a held phase difference $\Delta\theta3'$ up to the previous burst by the arbitrary coefficient. In this way, the weighting circuit 16 obtains the averaged phase difference $\Delta\theta3$. The averaged phase difference $\Delta\theta3$ is fixed during the current burst period.

The integrating circuit 17 integrates the averaged phase difference $\Delta\theta3$ output from the weighting circuit 16 in units of symbols. The vector transformation circuit 18 transforms the output from the integrating circuit 17 into real and imaginary part amplitude values, and outputs them to the phase rotating unit 13. The phase rotating unit 13 synthesizes the real and imaginary part amplitude values from the integrating circuit 17 with a received signal, thereby correcting the phase.

Figure 3:
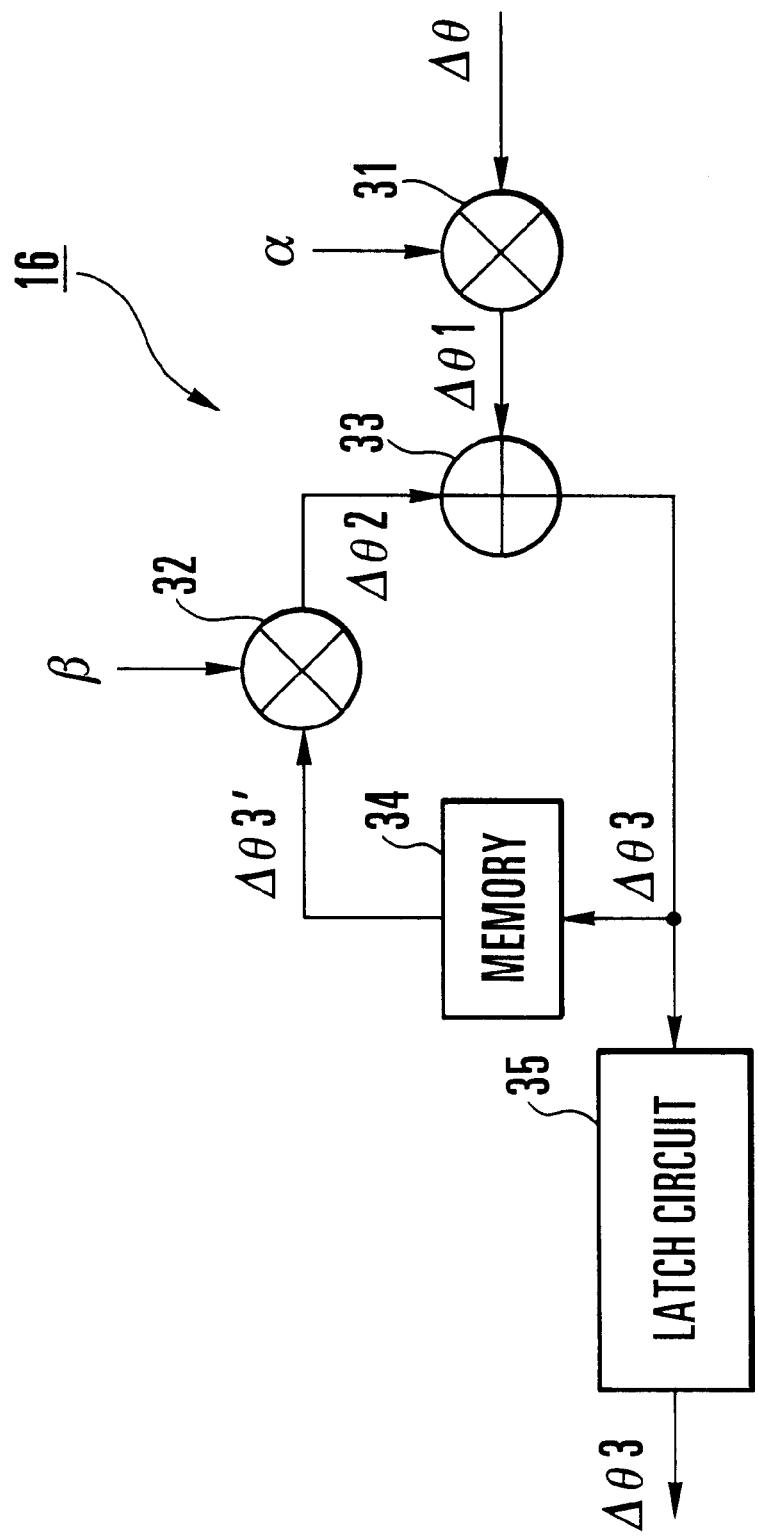
FIG. 3 is a block diagram showing a weighting circuit in FIG. 1.
Figure 4:
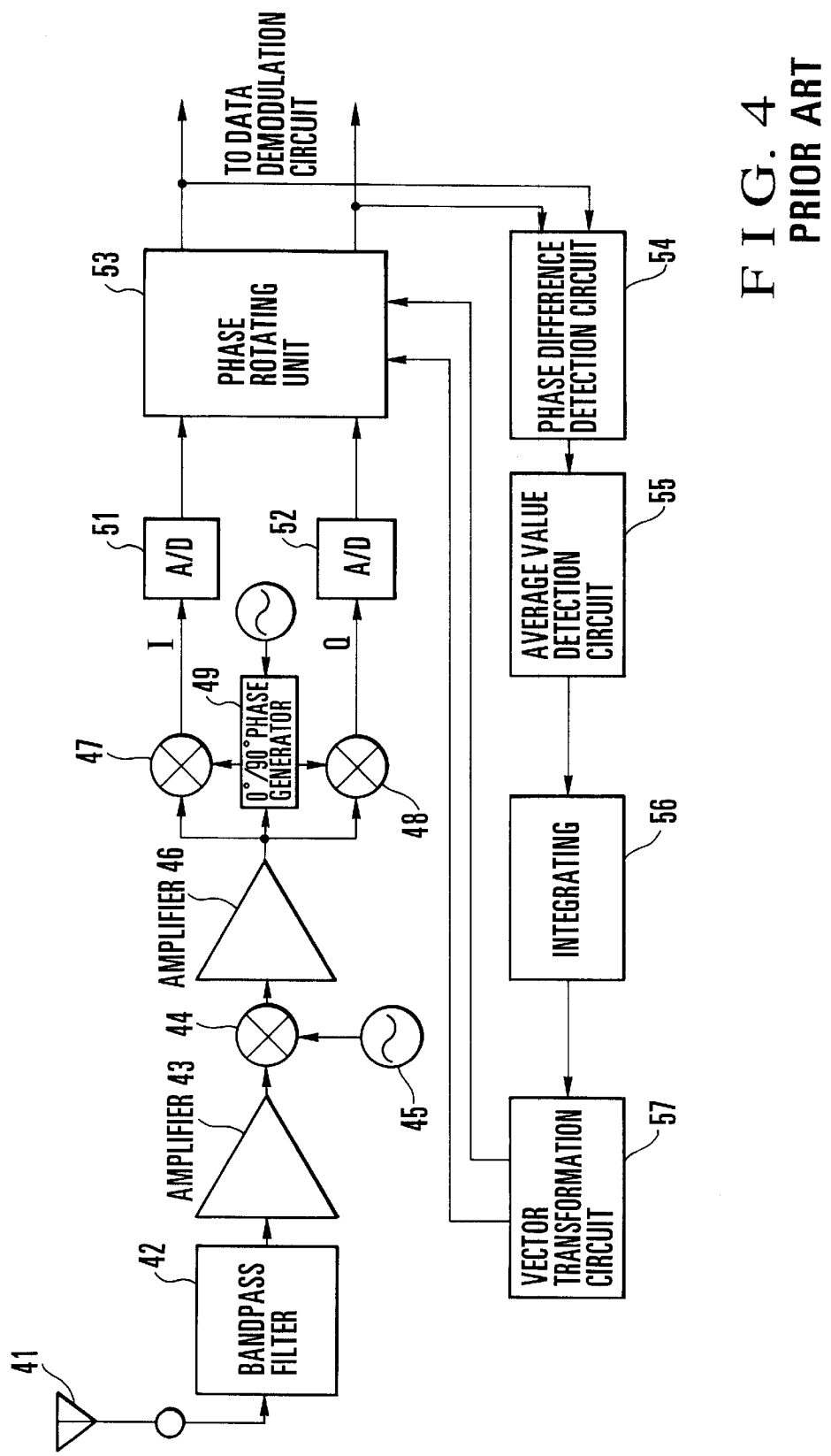
FIG. 4 is a block diagram showing an automatic frequency control circuit on a conventional receiver side.

The weighting circuit 16 will be explained in detail with reference to FIG. 3.

The weighting circuit 16 is constituted by multipliers 31 and 32, adder 33, memory 34, and latch circuit 35.

In the weighting circuit 16, the multiplier 31 multiplies the phase difference $\Delta\theta$ from the average value detection circuit 15 by the coefficient $\alpha$, thereby outputting the first weighting phase difference $\Delta\theta1$. The multiplier 32 multiplies an averaged phase difference $\Delta\theta3'$ up to the previous burst stored in the memory 34 by the coefficient $\beta$, thereby outputting the second weighting phase difference $\Delta\theta2$. The adder 33 adds the first and second weighting phase differences $\Delta\theta1$ and $\Delta\theta2$ respectively from the multipliers 31 and 32 to newly output an averaged phase difference $\Delta\theta3$. The latch circuit 35 latches the averaged phase difference $\Delta\theta3$ from the adder 33 during one burst period, and outputs it to the integrating circuit 17. The memory 34 updates and stores the averaged phase difference $\Delta\theta3$ from the adder 33 as an averaged phase difference $\Delta\theta3'$ up to the previous burst.

The coefficients α and β are set to, e.g., α=0.1 and β=0.9 so as to reduce the influence of a newly detected phase difference and attach weight to the averaged phase difference Δθ3' up to the previous burst. This can reduce the influence of a value erroneously detected due to noise, or the like during the current burst, and can improve the precision of the frequency offset value between the transmitting and receiving sides. Note that the values α and β can be arbitrarily set.

As has been described above, the present invention can increase the detection precision of a frequency offset value even under the frequency selective multipath fading environment in an automatic frequency control circuit for correcting the influence of the frequency offset of a radio data communication terminal using a system of equalizing received signals by obtaining transmission path characteristics during the preamble period by a narrow-band modulation method. Therefore, the present invention can improve the error rate of data arising from the influence of the frequency offset, compared to the prior art, and can improve the transmission efficiency and reliability.

What is claimed is:

1. An automatic frequency control circuit in a receiver for receiving and quadrature-demodulating a multilevel quadrature-modulated signal transmitted during a preamble period and a data period subsequent to the preamble period, comprising:

phase difference detection means for obtaining a phase difference between pattern signals per period on the basis of a quadrature-demodulated pattern signal component and a pattern signal component one period before the quadrature-demodulated pattern signal component, the pattern signals being repetitively transmitted with the same pattern from a transmitter during the preamble period;

average value calculation means for calculating an average value of first phase differences between the pattern signals repetitively output from said phase difference detection means, thereby obtaining a second phase difference in units of symbols in a current burst;

weighting means for weighting the second phase difference from said average value detection means and a third phase difference up to a previous burst, thereby obtaining a fourth phase difference up to the current burst; and phase correction means for correcting a demodulated received signal on the basis of the fourth phase difference from said weighting means.

2. A circuit according to claim 1, wherein said weighting means comprises:

multiplication means for multiplying the second phase difference from said average value calculation means by a first coefficient;

addition means for adding an output from said multiplication means and a value prepared by multiplying the third phase difference up to the previous burst by a second coefficient, thereby outputting the fourth phase difference;

storage means for storing the fourth phase difference from said addition means until a next burst; and latch means for latching the fourth phase difference from said addition means during a current burst period.

3. A circuit according to claim 2, wherein the first and second coefficients are arbitrarily set.

4. A circuit according to claim 2, wherein the second coefficient is set larger than the first coefficient.

5. A circuit according to claim 1, wherein said phase correction means comprises:

integral means for integrating the fourth phase differences from said weighting means in units of symbols during the data period;

transformation means for transforming an output from said integral means into signal components; and phase rotating means for rotating a phase of a demodulated received signal on the basis of outputs from said transformation means, thereby correcting the phase.

6. A circuit according to claim 1, wherein the signal components are real and imaginary part amplitude values.

7. A circuit according to claim 1, wherein the pattern signals repetitively transmitted from the transmitter are pseudo noise (PN) signals.

8. A circuit according to claim 1, wherein said circuit further comprises quadrature demodulation means for quadrature-demodulating the received multilevel quadrature-modulated signal, and outputting two baseband signals having different phases, and said phase difference detection means performs phase difference detection operation using the baseband signals from said quadrature demodulation means.

9. An automatic frequency control circuit for correcting influence of a frequency offset of a radio data communication terminal using a system of equalizing received signals by obtaining transmission path characteristics during a preamble period by a narrow-band modulation method, in which predetermined pseudo noise (PN) signals are repetitively transmitted as preamble signals from a transmitter, comprising:

means for obtaining a phase difference per PN period on the basis of real and imaginary part amplitude values of a current PN signal component and a PN signal one period before the current PN signal component, which is quadrature-demodulated during the preamble period;

means for dividing the phase difference by the number of symbols per PN period, thereby obtaining a phase difference in units of symbols;

means for multiplying the obtained phase difference by a coefficient α;

means for adding a value prepared by multiplication of the coefficient, and a value prepared by multiplying a phase difference up to a previous burst by a coefficient β, thereby calculating a phase difference up to a current burst;

means for storing the calculated phase difference up to the current burst until a next burst;

means for latching the calculated phase difference up to the current burst during a current burst period;

means for integrating the calculated phase differences up to the current burst in units of symbols during a data demodulation period;

means for transforming the integrated value into real and imaginary part amplitude values; and means for correcting a phase of a demodulated received signal on the basis of the transformed real and imaginary part amplitude values.

* * * * *